United States Patent [19]
Waldenrath et al.

[11] Patent Number: 4,629,637
[45] Date of Patent: Dec. 16, 1986

[54] COATED OPTICALLY ISOTROPIC OR MONOAXIALLY FILM OF PLASTIC

[75] Inventors: Werner Waldenrath, Cologne; Hans-Leo Weber, Rommerskirchen; Uwe Claussen, Leverkusen, all of Fed. Rep. of Germany

[73] Assignee: Bayer Aktiengesellschaft, Leverkusen, Fed. Rep. of Germany

[21] Appl. No.: 724,386

[22] Filed: Apr. 18, 1985

[30] Foreign Application Priority Data

Apr. 21, 1984 [DE] Fed. Rep. of Germany ....... 3415104

[51] Int. Cl.$^4$ .......................... C09K 19/00; C09K 3/34; B44F 1/00
[52] U.S. Cl. ......................................... 428/1; 428/412; 428/522; 428/913; 428/423.1; 428/906; 428/518; 428/520; 428/517; 427/164; 264/176.1; 350/334; 350/337

[58] Field of Search ................... 428/1, 522, 412, 913, 428/423.1; 427/164

[56] References Cited

U.S. PATENT DOCUMENTS 4,262,072 4/1981 Wendling et al. ...................... 428/1
4,310,577 1/1982 Davison et al. .......................... 428/1
4,492,718 1/1985 Mayer et al. ......................... 427/164
4,544,583 10/1985 Claussen et al. ....................... 428/1

*Primary Examiner*—P. C. Ives
*Attorney, Agent, or Firm*—Sprung Horn Kramer & Woods

[57] ABSTRACT

Optically monoaxial film of plastic which is coated with a product formed by hardening a mixture of a prepolymer, containing at least two (meth)acryloyl groups, and a (meth)acrylic acid ester of a monohydric or polyhydric aliphatic alcohol and/or an aliphatic vinyl compound, and the use of this film in liquid crystal visual displays.

6 Claims, No Drawings

COATED OPTICALLY ISOTROPIC OR MONOAXIALLY FILM OF PLASTIC

The invention relates to a coated film of plastic with improved physical and chemical properties, a process for its preparation and its use in liquid crystal visual displays.

In most industrial applications of films of plastic, the optical anisotropy which frequently exists and which leads to birefringence has no effect. Such applications are, for example, drawing films in cartography, information carriers for signal displays, color filters, membrane switches and reflex films. In contrast, isotropy is an important property if the films of plastic are used in optical equipment or arrangements which use polarised light. This is the case, for example, in the known liquid crystal display units (LCD). The windows or substrates used in such display units should not have an interfering influence on the polarised light. As is known, birefringence in an optically monoaxial crystal is based on the fact that lightwaves with planes of polarisation which are perpendicular to one another as a rule assume different degrees of diffusion speed in the crystal. Simultaneously with the birefringence, the polarisation stage of the light is changed. It is therefore obvious that the use of birefringent films of plastic as windows in display units leads to great difficulties if the display effect is in turn based on a birefringence or rotation of the plane of polarisation in the liquid crystal layer which is influenced by the electrical field. The solution to the problem of birefringence is therefore the essential precondition for industrial use of films of plastic in liquid crystal display units. For this reason, glass has hitherto been employed as the universal and solely industrially useful material in liquid crystal displays. However, the use of glass is associated with a number of disadvantages. Because glass is difficult to process, only certain formats, depending on the equipment on the machinery, can be provided, and these can be subdivided inexpensively by scratching and breaking only into rectangular formats. Glass splinters which thereby result may impair the function of the display and hence lead to stoppages.

Furthermore, the expenditure on handling and storage is considerable with the large number of pieces and various formats obtained. Moreover, the fragility of the glass necessitates plate thicknesses of at least 1 mm, so that the intrinsic weight of the glass plates has a troublesome influence in comparison with the other components of the display unit.

There has therefore been no lack of attempts to use transparent plastics in liquid crystal displays (see, for example, U.S. Pat. No. 4,228,574, British Pat. No. 2,052,779, SID 81, page 86 and page 116, and SID 82, pages 178 to 181). However, as a rule, plastic is not simultaneously isotropic and particularly mechanically or chemically resistant. In addition, the technique of liquid crystal displays based on glass cannot be transferred to plastic without reservation. A particular difficulty which is unknown in the glass technique is the chemical and physical stability of the material of the casing. Liquid crystals and mixtures containing them are solvents which have the property of diffusing into the matrix of the plastic. This changes the volume and hence the dimensions of the display, which in turn is very sensitive, for example, to changes in the separation of the plates. Furthermore, the mechanical properties are impaired. A decisive fact is, however, that the relatively low volume of liquid crystal phase very rapidly loses or modifies its action by complete or selective diffusion and can thus render the display useless. This particularly applies if the display is exposed to higher temperatures.

The invention is therefore based on the object of providing coated films of plastic which are sufficiently chemically and physically stable.

The object is achieved by sealing the surface of the plastic with an optically isotropic lacquer coating in a manner which is known per se.

All the lacquer systems which are suitable for plastics are based on organic polymer molecules. They are therefore subject to the same limitations as the base material itself.

It could therefore not be predicted whether a suitable material was to be found at all.

A film of plastic is flexible, and its particular advantage is that it can be rolled up. A lacquer system must also have these properties; the lacquer should thus neither fracture nor crack off when bent or rolled. These properties are provided by systems which have a low degree of crosslinking but are not stable to diffusion. Highly crosslinked systems easily craze or even flake when bent, which weakens their stability to diffusion.

It has now been found that suitable lacquers are built up according to the present invention from prepolymers and reactive monomers, the prepolymer and reactive monomer being combined to modify the lacquer properties and to establish the desired processing viscosity.

The prepolymers have at least two (meth)acryloyl groups, preferably three to five acryloyl groups, and are derived from polyesters, polyethers, polyepoxide compounds, aliphatic polyols, polyurethanes and vinyl polymers. Such (meth)acrylate prepolymers are known and are described, for example, in U.S. Pat. Nos. 2,101,107; 2,413,973; 2,951,758; 3,066,112; 3,301,743; 3,368,900; 3,380,831; 3,455,801; 3,469,982; 3,485,732; 3,530,100; 3,551,246; 3,552,986; 3,628,963; 3,660,145; 3,664,861; 3,689,610; 3,719,521; 3,732,107; 3,782,961; 3,840,369; 3,888,830; 4,033,920; 4,081,492 and 4,206,025; British Patent Specification Nos. 1,006,587; 1,241,823; 1,241,824 and 1,321,372; and German Offenlegungsschriften Nos. 1,916,499 and 2,853,921.

Preferred prepolymers with at least two (meth)acryloyl groups are polyester (meth)acrylates, polyepoxy (meth)acrylates and polyurethane (meth)acrylates.

The reactive monomers are acrylic or methacrylic acid esters of monohydric and polyhydric aliphatic alcohols, such as, for example, ethylene glycol di(meth)acrylate; di(meth)acrylates of diethylene glycol, triethylene glycol, tetraethylene glycol and pentaethylene glycol; propylene glycol di(meth)acrylate; di(meth)acrylates of di- to penta-propylene glycol; neopentyl di(meth)acrylate; butane-1,4-diol di(meth)acrylate; hexane-1,6-diol di(meth)acrylate; and trimethylolpropane tri(meth)acrylate.

Aliphatic vinyl monomers, such as N-vinylpyrrolidone or vinyl acetate, can moreover be employed.

Such formulations can be hardened directly under electron beams or after addition of 1–5% by weight of commercially available photoinitiators, such as aromatic ketones or benzoin derivatives, in particular in combination with aliphatic tertiary amine accelerators.

The lacquers employed according to the present invention can be prepared in all the mixing units usual in the lacquer industry, such as, for example, dissolvers or bead mills.

They are applied, for example, by rolling or coating with a doctor blade. The coating thicknesses apolied are 2–50 μm, preferably 5–15 μm.

The coating can be applied to one or both sides.

Not only is the permeability to water vapor reduced by this coating, but the resistance to chemicals is also quite considerably improved.

Possible plastics are those which form clearly transparent structures and can be prepared in optically monoaxial or isotropic form.

Examples of suitable plastics are polyaryl sulphone, in particular polyphenyl sulphone ether, polystyrene, polyvinyl chloride and polyurethane. Polymers which have good optical qualities, such as styrene acrylonitrile copolymers, polymethylpentene, polycarbonate, polyacrylate, polymethacrylate, cellulose ester or mixtures and copolymers containing the polymers mentioned, are preferably used.

Polycarbonate or mixtures of plastics containing at least 10% by weight of polycarbonate are especially preferably employed.

Cast films of mixtures of 90% by weight to 60% by weight of linear polyaryl sulphone and 10% by weight to 40% by weight of linear polycarbonate, such as are known, for example, from German Offenlegungsschrift No. 2,948,673, are particularly suitable for the preparation of the monoaxially birefringent or birefringence-free plastics according to the invention.

These films preferably have mean weight-average molecular weights of $\overline{M}_w = 60,000$ and can be obtained, for example, by stabilising solutions of the polyaryl sulphones and polycarbonates, before the production of the cast films, by addition of 5–30% by weight, based on the solids employed, of a solubilising agent and drying the cast films produced by customary processes.

Possible polycarbonates in the context of the invention are the polycondensates obtained by reacting aromatic dihydroxy compounds, in particular dihydroxydiarylalkanes, with phosgene or diesters of carbonic acid, although, besides the unsubstituted dihydroxydiarylalkanes, those in which the aryl radicals carry methyl groups or halogen atoms in the o- and/or m-position relative to the hydroxy group are also suitable. Branched polycarbonates are likewise suitable. Cast polycarbonate is preferred.

The polycarbonates have mean weight-average molecular weights $\overline{M}w$ of between 10,000 and 100,000, preferably between 20,000 and 40,000, determined by measurement of $\eta_{rel}$ in $CH_2Cl_2$ at 20° C. and at a concentration of 0.5 g per 100 ml. $\overline{M}w$ for the polycarbonate cast material is preferably 75,000–110,000.

Examples of suitable aromatic dihydroxy compounds are hydroquinone, resorcinol, 4,4′-dihydroxydiphenyl, bis-(hydroxyphenyl)alkanes, such as, for example, $C_1$–$C_8$-alkylidenebisphenols, bis-(hydroxyphenyl)-cycloalkanes, such as, for example, $C_5$–$C_{15}$-cycloalkylene- or $C_5$–$C_{15}$-cycloalkylidene-bisphenols, bis-(hydroxy-phenyl) sulphides, ethers, ketones, sulphoxides or sulphones, and furthermore α, α′-bis-(hydroxyphenyl)-diisopropyl-benzene and the corresponding nuclearalkylated or nuclearhalogenated compounds. Polycarbonates based on 2,2-bis-(4-hydroxy-phenyl)-propane (bisphenol A), 2,2-bis-(4-hydroxy-3,5-dichloro-phenyl)-propane (tetrachlorobisphenol A), 2,2-bis-(4-hydroxy-5,5-dibromo-phenyl)-propane (tetrabromobisphenol A), 2,2-bis-(4-hydroxy-3,5-dimethylphenyl)-propane (tetramethylbisphenol A), 1,1-bis-(4-hydroxy-phenyl)-cyclohexane (bisphenol Z) and trinuclear bisphenols, such as α, α′-bis-(4-hydroxyphenyl)-p-diisopropylbenzene are preferred.

Other aromatic dihydroxy compounds which are suitable for the preparation of polycarbonates are described in U.S. Pat. Nos. 2,970,131, 2,991,273, 2,999,835, 2,999,846, 3,028,365, 3,062,781 and 3,271,367.

Cellulose esters in the context of the invention are obtained by customary processes by esterification of cellulose with aliphatic monocarboxylic acid anhydrides, preferably acetic anhydride and butyric anhydride or acetic anhydride and propionic anhydride. The hydrolysis, which is to be carried out in the crude solution, is controlled by a slight excess of water so that a small hydroxyl content (4 to 25) is retained. Oxidative bleaching of the cellulose ester isolated from the solution must be carried out so that the oxidising agent can no longer be detected in the end product; if appropriate, after-treatment with a reducing agent must be carried out.

To determine the OH number, the free hydroxyl groups of the cellulose ester are esterified with acetic anhydride in pyridine, the excess anhydride is reacted with water and the mixture is back-titrated [instructions: C. J. Mahn, L. B. Genung and R. F. Williams, Analysis of Cellulose Derivatives, Industrial and Engineering Chemistry, Vol. 14, No. 12, 935–940 (1942)].

The viscosity of the cellulose esters should be 0.4 to 0.5 poise, measured as a 20% strength by weight solution in acetone. Cellulose esters which are preferably to be used have, in the case of the acetobutyrates, an acetic acid content of 17 to 23% by weight and a butyric acid content of 45 to 50% by weight and, in the case of the acetopropionates, a propionic acid content of 61–69% by weight and an acetic acid content of 2–7% by weight. The OH numbers are usually between 4 and 25. The mean weight-average molecular weights $\overline{MW}$ are between 10,000 and 1,000,000, preferably between 100,000 and 500,000.

Suitable polyaryl sulphones in the context of the invention have mean weight-average molecular weights $\overline{M}w$ (measured by the light scattering method in $CHCl_3$) of between 1,000 and 200,000, preferably between 20,000 and 60,000. Examples of these are the polyaryl sulphones which can be obtained by known processes from 4,4′-dichlorodiphenyl sulphone and a bisphenol, in particular 2,2-bis-(4-hydroxy-phenyl)-propane, and which have mean weight-average molecular weights ($\overline{M}w$) of 2,000 to 200,000.

Polystyrenes which are suitable according to the present invention are homopolymers of styrene or copolymers of styrene with, preferably, acrylonitrile and/or butadiene and/or maleic acid esters, these polymers having been obtained with an $\overline{M}w$ of 10,000–600,000 from the monomers or the mixture of the monomers by suspension polymerisation in the presence of catalysts ($\overline{M}w$ is measured in dimethylformamide at c=5 g/l and 20° C.).

(For literature in this context, see: Beilsteins Handbuch der Organischen Chemie (Beilstein's Handbook of Organic Chemistry), fourth edition, third supplement, Volume 5, pages 1163–1169, Springer Verlag 1964; and H. Ohlinger, Polystyrol, 1. Teil, Herstellungsverfahren und Eigenschaften der Produkte (Polystyrene, Part 1, Preparation processes and properties of the products), Springer Verlag 1955).

In addition, mixtures of polymers which give optically transparent plastics are suitable. The advantage of these mixtures is an improvement in the mechanical and, in particular, chemical properties, above all the resistance of the plastic towards the constituents of the liquid crystal phase at elevated temperatures.

Mixtures with silicones or polyesters are preferred.

The optically monoaxial plastics can be prepared, for example, by casting or extrusion, but no universal process can be given. In principle, it is necessary to mobilise the polymer matrix and to orientate it by applying a directional force. If this mobility is now frozen under the influence of a directional force, an optically monoaxial plastic is formed.

Casting processes in which the polymer is dissolved in a suitable solvent of the maximum possible volatility and is subsequently cast to a layer, from which the solvent can be removed, for example by evaporation, are preferred. Polycarbonate is particularly suitable for this process.

Another particularly preferred process is a new process in which an optically monoaxial birefringent film of plastic is first prepared in a known manner by casting or extrusion and, by radiant heat or by immersion in a solvent or swelling agent, irreversible structure relaxation processes are then triggered off in the layers of the film close to the surface, these processes causing molecular reorientation in the layers close to the surface, which is retained after the film has been cooled and dried and results in elimination or compensation of the birefringence. As a result of the heat treatment or, alternatively, the immersion process, the molecular matrix of the molecules is evidently loosened to such a degree in the zones close to the surface that molecular reorientation (relaxation) is made possible and the birefringence disappears almost completely. It is surprising that this reorientation remains irreversible; that is to say is so as to speak frozen on cooling and drying. It is essential that the film is exposed to the radiant heat or the solvent or swelling agent for only a relatively short time. Thus, layers of the film close to the surface are transiently heated by the radiant heat, whilst the volume is hardly affected, if at all. This applies, in particular, to radiation sources with a wavelength in the region of an absorption band of the material of the film. The penetration depth of the radiation can be controlled via the wavelength. A "layer close to the surface" is defined here as a region which corresponds to 10 to 30%, preferably 15 to 20%, of the total thickness of the film. This contrasts with the tempering process frequently used in industry, in which the entire volume of the material is heated under stationary conditions.

In an analogous manner, the treatment of the film in an immersion bath takes place only for such a short time that the entire film is not impregnated by the solvent, but the solvent can diffuse only into the outer layers close to the surface. Penetration of the solvent front into the film can be rendered visible with an interference microscope. In the experiments carried out here, it was not possible to observe shrinkage of the film, such as occurs as a result of a longer-lasting action of the solvent or swelling agent. After drying, a film with a glass-clear surface of high optical quality is obtained.

The birefringence originally present is so greatly reduced by the heat treatment or, alternatively, by the immersion bath treatment that virtually no change to the state of polarisation occurs when these films are used in connection with LCD displays. A possible explanation for the reduction in the birefringence is that, as a result of the production process (casting), aligned molecular structures are present in the layers close to the surface and cause anisotropy and hence optical birefringence. On warming and also on partial solution of these layers, only the molecular matrix is loosened and the mobility of the molecules is increased to the extent that the abovementioned compensation and relaxation processes can take place and the anisotropy largely disappears. On subsequent drying, the mobility is then "frozen" again. Surprisingly, the molecular orientation in the layers close to the surface is thereby retained.

Cast films of plastic with a thickness in the range from 5 $\mu$m to 0.8 mm are advantageously used.

The films are subsequently treated with a swelling agent or solvent by exposure to the solvent or swelling agent in a bath for 1 second to 5 minutes, preferably 10 seconds to 2 minutes. The treatment is carried out at room temperature. The partially dissolved or partially swollen films are dried in a stream of air at temperatures from 20° to 140° C.

Polymers for which a solvent or swelling agent can be given which, besides the desired isotropy effect, produces no undesirable side effects, such as, for example, turbidity and produces a clear homogeneous surface are advantageously used as the starting material for the films. Examples of possible polymers are polystyrene, polyvinyl chloride, polyacrylate and polysulphone.

Suitable solvents or swelling agents for the required treatment are xylene, cyclohexanone, tetrahydrofuran, methyl ethyl ketone, toluene, benzyl alcohol, dimethylformamide, methylene chloride, acetone, acetic acid ethyl ester, ethylene chloride, trichloroethane, chloroform, m-cresol, pyridine, dioxane, benzene, chlorobenzene, tetralin, ethyl acetate, acetonitrile and carbon tetrachloride.

Polycarbonate films which are advantageously immersed in a tetrahydrofuran bath have proved particularly suitable.

The new coated films are suitable for the production of display instruments which can be exposed to high temperatures and have a low permeability to water vapour, preferably for automobile displays.

EXAMPLES

EXAMPLES 1

Preparation of a lacquer 75 parts by weight of an aliphatic urethane acrylate prepared from oxyethylated trimethylol propane, isophorone diisocyanate and hydroxyethyl acrylate in the presence of thiodiglycol according to German Offenlegungsschrift No. 2,737,406, Example 1, 25 parts by weight of hexanediol diacrylate, 40 parts by weight of trimethylolpropane triacrylate, 60 parts by weight of N-vinylpyrrolidone and 10 parts by weight of a commercially available photoinitiator (Irgacure 184; Ciba Geigy) are intimately mixed in a dissolver. The viscosity is 80 seconds in a DIN 4 cup.

This lacquer is applied to an optically isotropic polycarbonate film 100 $\mu$ thick in a coating thickness of 12 $\mu$ (corresponding to 12 g/m$^2$) using a spiral doctor blade, and is hardened at a belt speed of 10 m/minute under a high-pressure Hg vapor lamp with an output of 80 W/cm of lamp length.

EXAMPLE 2

The procedure followed is as described in Example 1, but the addition of the photoinitiator is dispensed with in the preparation of the lacquer. The viscosity is not thereby changed. Hardening now takes place under an electron beam emitter with a radiation dose of 4 M rad.

EXAMPLE 3

5 g of a liquid crystal mixture consisting of 38% of 4-(4-cyanophenyl)cyclohexyl-pentane, 26% of 4-(4-cyanophenyl)cyclohexyl-propane, 25% of 4-(4-cyanophenyl)cyclohexyl-heptane and 11% of 4-(4-cyanobiphenyl)cyclohexyl-pentane are enclosed between two sheets of the material obtained according to Example 2 and the system is heated at 110° C. for 9 hours. Thereafter, the sample is analysed and agreement with the starting value is found.

The comparison experiment carried out with unprotected polycarbonate gives a cloudy, swollen material which is stuck together and in which free liquid crystal material is no longer to be found.

We claim:

1. An optically isotropic or monoaxial film of a polymer selected from the group consisting of polyaryl sulphone, a polyacrylate, polymethacrylate, polycarbonate or of a mixture or copolymer containing such polymer, the film being coated with a product formed by hardening under electron beams a mixture of (a) a prepolymer and (b) a (meth)acrylic acid ester of a polyhydric aliphatic alcohol and/or N-vinylpyrrolidone, the prepolymer (a) containing two to five (meth)acryloyl groups and being derived from a polyether or polyurethane.

2. A film according to claim 1, wherein the prepolymer (a) contains 2,3 or 4 (meth)acryloyl groups.

3. A film according to claim 1, wherein (b) is selected from the group consisting of ethylene glycol di(meth)acrylate,; a di(meth)acrylate of diethylene glycol, triethylene glycol, tetraethylene glycol or pentaethylene glycol; propylene glycol di(meth)acrylate; a di(meth)acrylate of di-to pentapropylene glycol; neopentyl di(meth)acrylate; butane-1,4-diol di(meth)acrylate; hexane-1,6-diol di(meth)acrylate; and trimethylolpropane tri(meth)acrylate.

4. A film according to claim 1, wherein the polymer of the film is polycarbonate.

5. A film according to claim 1 wherein the polymer of the film by weight comprises 60 to 90% of linear polyaryl sulphone and 40 to 10% of linear polycarbonate.

6. A liquid crystal visual display containing a film according to claim 1.

* * * * *